United States Patent [19]
Zuidhof

[11] Patent Number: 5,044,003
[45] Date of Patent: Aug. 27, 1991

[54] X-RAY IMAGING SYSTEM
[75] Inventor: Peter Zuidhof, Eindhoven, Netherlands
[73] Assignee: U.S. Philips Corporation, New York, N.Y.
[21] Appl. No.: 579,909
[22] Filed: Sep. 10, 1990
[30] Foreign Application Priority Data
Sep. 15, 1989 [NL] Netherlands ............... 8902309
[51] Int. Cl.⁵ .................................. H05G 1/64
[52] U.S. Cl. .............................. 378/99; 378/98; 358/111
[58] Field of Search ................. 378/99, 98; 358/111
[56] References Cited
U.S. PATENT DOCUMENTS

| | | | |
|---|---|---|---|
| 4,193,089 | 3/1980 | Brougham et al. | 358/111 |
| 4,355,330 | 10/1982 | Fukui | 358/111 |
| 4,432,014 | 2/1984 | Ross et al. | 358/111 |
| 4,809,071 | 2/1989 | Yokouchi et al. | 378/99 |
| 4,852,139 | 7/1989 | Sandrik et al. | 378/99 |
| 4,918,534 | 4/1990 | Lam et al. | 378/99 |

FOREIGN PATENT DOCUMENTS 3626532 11/1988 Fed. Rep. of Germany .............. H05G/1/64

Primary Examiner—Carolyn E. Fields
Assistant Examiner—David P. Porta
Attorney, Agent, or Firm—William Squire

[57] ABSTRACT

Image flicker can be prevented by applying vertical image compression to the entrance screen of a television pick-up tube in a X-ray imaging system. To this end, an X-ray imaging system is provided with an anamorphic optical system. The compressed image is displayed on a television monitor in the correct proportions when the image detection face, scanned by the electron beam, in the television pick-up tube is adapted in conformity with the image compression.

8 Claims, 1 Drawing Sheet

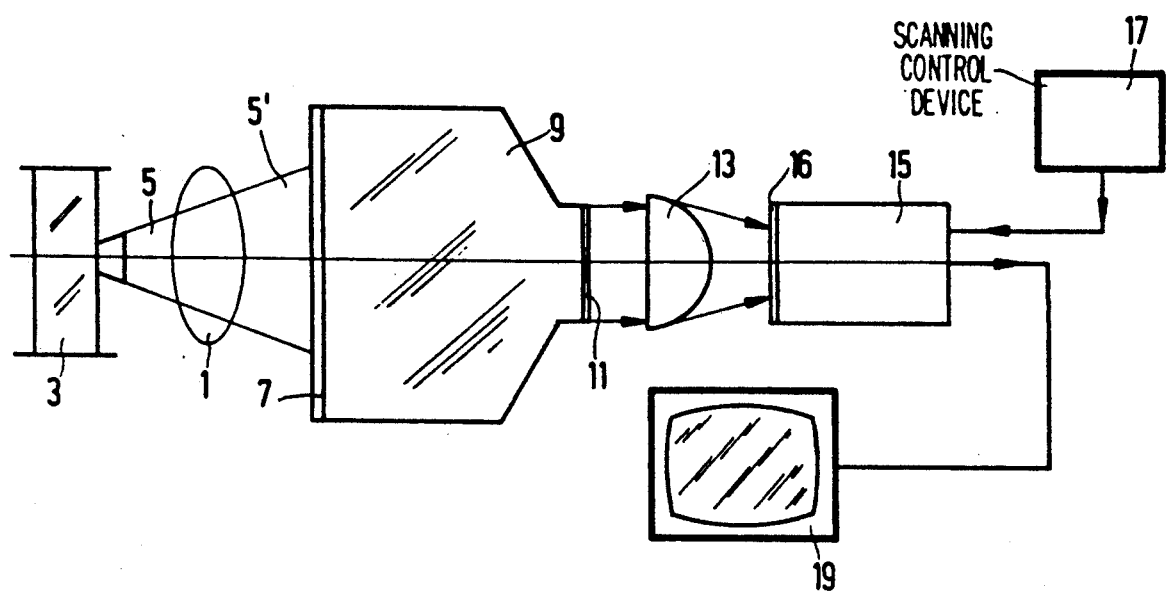
FIG.1
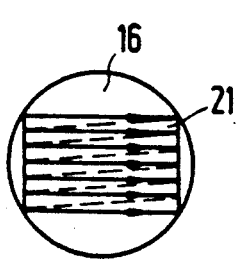  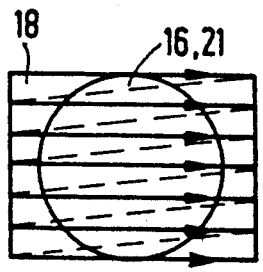  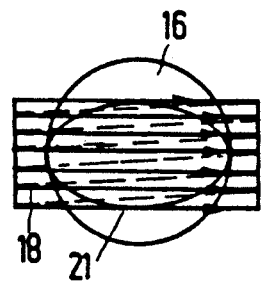  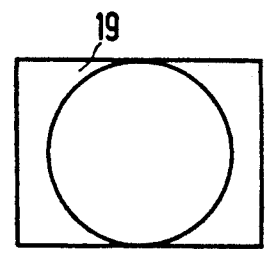
FIG.2a      FIG.2b      FIG.2c      FIG.2d
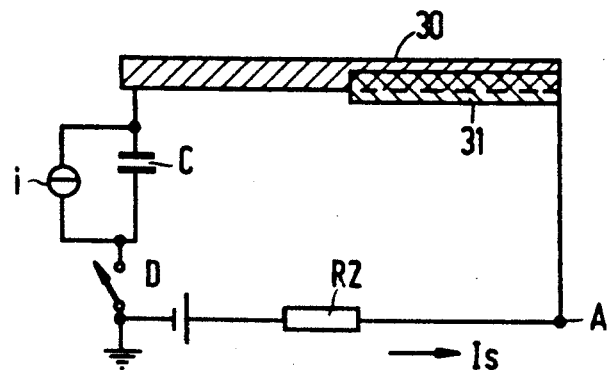
FIG.3

X-RAY IMAGING SYSTEM

BACKGROUND OF THE INVENTION

1. Field of the Invention

The invention relates to an X-ray imaging system comprising an X-ray source for irradiating an object by means of an X-ray beam, an X-ray image intensifier tube which comprises an entrance screen and an exit screen for converting an X-ray beam incident on the entrance screen into an optical image in the exit screen, a detection device which comprises a detection face which is situated opposite the exit screen in order to convert the optical image into an electric signal, a monitor which is connected to the detection device for a raster-like display of the signal as a monitor image, and an optical system which is arranged between the exit screen and the image detection face in order to image a circular optical image on the exit screen as an elliptical optical image on the image detection face.

2. Description of the Prior Art

An X-ray imaging system of this kind is known from German Offenlegungsschrift DE 36 26 532.

The cited Offenlegungsschrift describes an X-ray imaging system in which the detection device is formed by a matrix of optoelectronic transducers, for example a CCD matrix. The use of such a detection device gives rise to a problem in that the exit screen, often being circular, has a shape other than the customarily rectangular CCD matrix. In order to prevent loss of image information of the exit screen, the image of the exit screen forms the inscribed circle on the rectangular entrance screen of the detection device. As a result, the photosensitive elements at the edges of the CCD matrix are not used. When the circular optical image of the exit screen of the X-ray image intensifier tube is distorted so as to form an elliptical optical image, for example by means of an anamorphic system, a larger surface of the entrance screen of the detection device is used as the image detection face and the resolution increases in a direction of a longitudinal axis of the elliptical optical image. When an exit screen of the X-ray image intensifier tube and an entrance screen of the detection device of the same shape are used, the above problem does not occur and the optical image need not be adapted to the entrance screen of the detection device from a point of view of a resolution enhancement. Because of the shape of the entrance screen, a detection device constructed as a television pick-up tube is suitable for being coupled to the exit window of the X-ray image intensifier tube, for example by means of a fibre optical system, because the optical image of the round exit screen can be made to register with the entrance screen of the television pick-up tube. For example, for displaying the optical image on a rectangular television monitor whose sides relate as 3:4, for the image detection face use can be made of an inscribed rectangle having the same ratio of the sides on the entrance screen of the television pick-up tube. In that case information in the optical image which is situated outside the image detection face on the entrance screen will not be displayed on the television monitor. However, for medical imaging it is important that all information contained in the optical image is displayed on the television monitor; this is achieved by utilising the entire entrance screen of the television pick-up tube as the image detection face. In the television pick-up tube a positive charge image is built up on the image detection face which comprises, for example a photoconductive layer, which charge image corresponds to the optical image on the exit screen of the X-ray image intensifier tube. Using an electron beam which is deflected across the image detection face in a raster-like scanning pattern, the charge image is discharged and an electric signal is generated in the television pick-up tube. In order to obtain a high resolution, the entrance screen of the television pick-up tube is usually comparatively large in the case of medical imaging, a diameter of the entrance screen amounting to, for example 2 inches. Because of the comparatively large surface area of the image detection face, the image lines of the raster-like scanning pattern in the image detection face are spaced comparatively far apart, so that positive charge remains between the lines. When successive scanning patterns have been shifted with respect to one another, for example due to vibrations, the additional charge causes annoying flicker of the monitor image. Because the electron beam does not have the same cross-section everywhere across the image detection face, local variations occur in the monitor image due to the residual charge, which variations are not representative of the light on the exit screen of the X-ray image intensifier tube.

SUMMARY OF THE INVENTION

It is inter alia an object of the invention to provide an X-ray imaging system in which the image artefacts are counteracted. To achieve this, an X-ray imaging system in accordance with the invention is characterized in that the detection device comprises a television pick-up tube for the raster-like scanning of the image detection face along image line by means of an electron beam, the X-ray imaging system comprising a device for counteracting brightness variations of a monitor image of a uniform optical image, which device comprises the optical system, and also comprises a further device for reducing the image detection face in a direction of the short axis of the ellipse of the elliptical optical image.

When a distance between neighbouring image lines in the raster like scanning pattern is reduced, a build up of charge between the image lines remains limited, so that flicker of the monitor image is reduced. When neighbouring image lines adjoin or overlap one another, the charge image on the image detection face is completely broken down and the image flicker is further reduced. By compressing at the same time the optical image in a direction perpendicular to the direction of the image lines of the scanning pattern until the optical image is situated within the contours of the image detection face again, flicker of the monitor image can be prevented without loss of resolution in an image line direction as well as in a direction perpendicular thereto and also without loss of image information.

IN THE DRAWINGS

An embodiment of an X-ray imaging system in accordance with the invention will be described in detail hereinafter with reference to the accompanying drawing. Therein:

FIG. 1 diagrammatically shows an X-ray imaging system in accordance with the invention, FIGS. 2a, 2b, 2c and 2d show the entrance screen of the television pick-up tube for different image detection faces, and a monitor image of the entrance screen in accordance with FIG. 2c, respectively, and FIG. 3 diagrammatically shows an image line in the image detection face.

FIG. 1 shows an object 1 which is irradiated by an X-ray beam 5 emitted by an X-ray source 3. Areas having different X-ray absorption coefficients in the object 1 modulate the X-ray beam 5 so as to form an image carrying X-ray beam 5' which is incident on an entrance screen 7 of an X-ray image intensifier tube 9. The entrance screen 7 comprises a phosphor layer in which the image carrying X-ray beam 5' is absorbed while emitting photons. In a photocathode which contacts the phosphor layer, the photons liberate electrons which are accelerated, in an electric field of the X-ray image intensifier tube, to an energy of, for example 25 keV for application to the exit screen 11. The exit screen 11 comprises a phosphor layer in which the electrons are absorbed while emitting light. An optical image on the exit screen 11 has a comparatively high brightness due to the acceleration of the electrons and the comparatively small dimensions of the exit screen with respect to the entrance screen 7. The optical image is converted into an electric signal by means of an optical system 13 and a television pick-up tube 15 which comprises an entrance screen 16. To this end, an electron beam in the television pick-up tube 15 is deflected by a deflection coil (not shown in the Figure) so as to scan the entrance screen 16 in a raster-like scanning pattern. A positive charge image accumulated on the entrance screen 16, comprising, for example a photoconductive layer of pbO, is then broken down. The scanning of the entrance screen 16 is controlled by a device 17 in synchronism with a scanning cycle of a television monitor 19 in which, using an electron beam, a phosphorescent screen is scanned in a raster-like scanning pattern which in non-medical applications is similar to the scanning pattern on the entrance screen of the television pick-up tube. The phosphorescent screen lights up during scanning. In the case of non-medical applications, when the image on the entrance screen 16 of the television pick-up tube is displayed on the monitor 19, the part of the photoconductive layer of the entrance screen of the television pick-up tube, the so-called image detection face, which is scanned by the electron beam has the same ratios as the rectangular monitor image of the monitor 19.

FIG. 2a shows the entrance screen 16 with a rectangular image detection face 21 which is smaller than the entrance screen 16. A horizontal transit time of the electron beam across the entrance screen 16 amounts to, for example 52 µs and a vertical transit time amounts to, for example 20 ms. Details imaged on the entrance screen 16 are optimally used when the image detection face coincides with the entrance screen 16 as shown in FIG. 2b. The electron beam passes, for example from left to right across the image detection face and In the extreme right hand position it jumps to a lower left hand position so as to scan the image detection face again via an image line. A maximum horizontal transit time of the electron beam amounts to, for example 37 µs through the center of the image detection face. In the regions 18 which do not form part of the entrance screen 16, the electron beam is blanked. For the same ratios of the sides of the monitor image as used in FIG. 2a, it appears that a line spacing is greater in FIG. 2b. In combination with the fact that for medical diagnostic applications the entrance screen has a comparatively large diameter in relation to entrance screens of television pick-up tubes used for studio applications in order to ensure suitable representation of details, a positive residual charge remains between the image lines of FIG. 2b on the image detection face 21 after scanning. Consequently, in the case of a relative shift, in a direction perpendicular to the image line direction, of the raster like scanning pattern with respect to a preceding scanning pattern, flicker of the monitor image can occur. This is illustrated in FIG. 3. A positive charge on an image line 30 is discharged by the electron beam incident thereon. The photoconductive layer may be represented by a photosensitive current source i parallel to a capacitor C, which is positively charged by the exit screen 11 during the exposure of the image detection face 21. The electron beam is represented as a switch which connects the capacitor C to ground. The discharging of the capacitor C causes a voltage drop at the point D and a signal current $I_s$ will flow through a resistance $R_2$. The voltage at the point A is applied to the television monitor 19. Because the positive charge is not neutralised on both sides of the image line 30, more positive charge is neutralised by an electron beam during a subsequent scanning pattern, proceeding along a line 31, so that a larger signal current $I_s$ will flow. An electron beam in a subsequent scanning pattern, again following the image line 30, will cause a lower current $I_s$ again. Shifting of the raster-like scanning pattern with respect to the image detection face 21 is due, for example to variations of the deflection in the direction perpendicular to the image line direction, and also to movement of the deflection coil of the television pick-up tube due to mechanical shocks or vibrations.

The building up of positive charge between two neighboring image lines also has the effect that, if no dynamic focusing of the electron beam takes place in the television pick-up tube, an optical image of uniform brightness on the exit screen 11 is displayed as a monitor image containing a centrally situated dark spot. The surface for which the electron beam has been focused is spherical, the center being a cross-over point of the electron beam. When the image detection face 16, being flat, is scanned, the electron beam will not be focused at the edges of the image detection face and a cross-section of the electron beam on the image detection face will have a largest dimension, at that area. Consequently, during the scanning of the image detection face the signal current $I_s$ generated at the edges of the image detection face will be larger than that generated in the center where the electron beam neutralises less positive charge of the charge image built up on the image detection face.

When use is made of an optical system 13 which comprises, for example an anamorphic system, for example a lens having a cylindrical surface or a system of prisms, the round exit screen 11 of the X-ray image intensifier tube 9 is imaged on the entrance screen 16 as an ellipse as shown in FIG. 2c. Via a vertical reduction of the image detection face, realised by means of the device 17, so that all image lines are situated nearer to one another, less charge accumulation can occur between the image lines and the described disturbing effects in the monitor image are counteracted. The device 17 comprises, for example a known sawtooth generator which is connected to a deflection coil in the television pick-up tube 15 and which may be integral therewith. The vertical transit time of the electron beam amounts to, for example 20 ms, the horizontal transit time of the electron beam along the main axis of the ellipse being 37 µs. Preferably, the image detection face 21 is reduced in a direction of the short axis of the elliptical optical image, so that the elliptical optical image is tangent to the long sides of the image detection face 21. When the scanned image detection face is displayed, the elliptical optical image is displayed on the monitor 19 as a circle, without loss of resolution in a direction of the image lines or in the direction perpendicular thereto, as shown in FIG. 2d.

What is claimed is:

1. An X-ray imaging system for imaging an object comprising:
    an X-ray source for irradiating the object with an X-ray beam;
    an X-ray image intensifier tube including an entrance screen and an exit screen for converting an X-ray beam incident on the entrance screen into an optical image in the exit screen;
    a detection device which includes an image detection face defining an image detection plane positioned opposite the exit screen to convert the optical image into an electrical signal, said detection device comprising a television pick-up tube for the raster-like scanning of the image detection face along image lines by an electron beam;
    a monitor connected to the detection device for a raster-like display of the signal as a monitor image;
    an optical system between the exit screen and the image detection plane to image a circular optical image on the exit screen as an elliptical optical image having long and short axes on the image detection plane; and
    means for reducing the image detection face in a direction of the short axis of the ellipse of the elliptical optical image, said optical system and means for reducing for counteracting brightness variations of the monitor image.

2. An X-ray imaging system as claimed in claim 1, wherein neighboring image lines at least adjoin one another after the reduction of the image detection face.

3. An X-ray imaging system as claimed in claim 2 wherein the short side of the image detection face is at least equal to the short axis of the ellipse.

4. An X-ray imaging system as claimed in claim 1, wherein the optical system comprises an anamorphic system.

5. An X-ray imaging system as claimed in claim 1 wherein the short side of the image detection face is at lest equal to the short axis of the ellipse.

6. An X-ray imaging system as claimed in claim 2 wherein the optical system comprises an anamorphic system.

7. An X-ray imaging system as claimed in claim 3 wherein the optical system comprises an anamorphic system.

8. An X-ray imaging system for imaging an object comprising:
    an X-ray source for irradiating the object with an X-ray beam;
    an X-ray image intensifier tube including an entrance screen and an exit screen for converting an X-ray beam incident on the entrance screen into an optical image in the exit screen;
    a detection device which includes an image detection face defining an image detection plane positioned opposite the exit screen to convert the optical image into an electrical signal, said detection device comprising a television pick-up tube for the raster-like scanning of the image detection face along image lines by an electron beam, the scan lines of the image detection face having a spacing which generally causes brightness variations;
    a monitor connected to the detection device for a raster-like display of the signal as a monitor image; and
    means for imaging a circular optical image on the exit screen as an elliptical optical image on the image detection plane and means for reducing said spacing for reducing said brightness variations.

* * * * *